US007729842B2

(12) United States Patent
Sugita

(10) Patent No.: US 7,729,842 B2
(45) Date of Patent: Jun. 1, 2010

(54) ELECTRONIC FOUR-WHEEL DRIVE CONTROL

(75) Inventor: Hidehiko Sugita, Zama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1085 days.

(21) Appl. No.: 11/402,653

(22) Filed: Apr. 12, 2006

(65) Prior Publication Data

US 2006/0276941 A1 Dec. 7, 2006

(30) Foreign Application Priority Data

Apr. 13, 2005 (JP) ............................ 2005-115932

(51) Int. Cl.
*G06F 19/00* (2006.01)
*B60K 28/16* (2006.01)

(52) U.S. Cl. ............................ 701/84; 701/83; 701/90; 180/197

(58) Field of Classification Search .................. 701/84, 701/83, 90, 91, 92; 180/197
See application file for complete search history.

(56) References Cited

U.S. PATENT DOCUMENTS 6,434,469 B1 * 8/2002 Shimizu et al. ............... 701/84
7,296,648 B2 * 11/2007 Tatara et al. ................ 180/242

FOREIGN PATENT DOCUMENTS

| | | | |
|---|---|---|---|
| EP | 1 205 331 | A2 | 5/2002 |
| EP | 1 393 952 | A2 | 3/2004 |
| EP | 1 393 959 | A2 | 3/2004 |
| EP | 1 604 856 | A1 | 12/2005 |
| JP | 2001-239852 | | 9/2001 |

OTHER PUBLICATIONS

European Search Report for corresponding European Application No. 06 25 2071, dated Aug. 1, 2006, 4 pages.

* cited by examiner

*Primary Examiner*—Khoi Tran
*Assistant Examiner*—Ronnie Mancho
(74) *Attorney, Agent, or Firm*—Young Basile

(57) ABSTRACT

A vehicle includes an internal combustion engine that drives a first set of wheels, a generator, wherein the generator is powered by the internal combustion engine, a inverter connected to an output of the generator, an AC motor connected to an output of the inverter, and a controller, wherein the controller controls the generator, the inverter and the AC motor. The AC motor drives a second set of wheels. Power output by the generator is controlled according to a desired torque output for the second set of wheels. The controller calculates a potential power based upon the current status of the generator and controls the AC motor by the inverter based on the smaller of the desired torque and the potential power output of the generator.

13 Claims, 14 Drawing Sheets

1L 5 2 1R 27FL 6 27FR 7 8 Degree of accel opening 10 9 27RL 4 11 27RR 3L 3R 13 12

ELECTRONIC FOUR-WHEEL DRIVE CONTROL

This application claims priority to Japanese Patent Application No. 2005-115932, filed Apr. 13, 2005, the entire content of which is incorporated herein by reference.

TECHNICAL FIELD

The invention relates to techniques for controlling vehicle torque, e.g., for a four-wheel drive vehicle utilizing an electric motor in combination with an internal combustion engine.

BACKGROUND

Hybrid vehicles may include a first set of drive wheels powered directly by an internal combustion engine and a secondary set of drive wheels powered by a direct current motor. The direct current motor may be powered by a battery or directly by a generator running off the internal combustion engine. When the generator is used to directly power the direct current motor, the torque of the direct current motor, and thus the secondary drive wheels, may be controlled by controlling the voltage output from the generator.

SUMMARY

With the existing vehicle drive control devices, since the torque is controlled directly by the output of the direct current motor, it is necessary to increase current to the direct current motor to increase the torque. However, increased current limits the life of a direct current motor brush such that the maximum torque must be limited to preserve the motor brush. Because torque output is limited, it is difficult to apply such a design to heavy vehicles and high-torque applications for four-wheel drive vehicles.

The present invention provides a torque control device that is equipped with an alternating current motor, instead of a direct current motor, and is capable of controlling the torque of the vehicle.

To achieve the objectives, the vehicle torque control device relating to the present invention is constructed of an internal combustion engine, a generator, an alternating current motor, an inverter and a controller. The internal combustion engine drives the main drive wheels and the generator. The alternating current motor drives the secondary drive wheels by supplying power generated by the generator. The inverter is positioned between the generator and alternating current motor. The controller calculates the required motor power required by the alternating current motor and controls the generator based on the required motor power calculated. The controller also calculates the potential power output that can be output by the generator based on the generating status of the generator. Additionally, the controller controls the alternating current motor by controlling the inverter based on the smaller power of the required motor power and the potential power output.

With the present invention, the alternating current motor is controlled by controlling the inverter based on the smaller of the calculated potential power output based on the current generator status and the power required by the alternating motor power so there is a balance between the power supplied from the generator and the power input to the inverter, which prevents a drop in voltage due to insufficient power supply to provide stable torque control.

In an embodiment, a vehicle comprises a first set of wheels; a second set of wheels, wherein each of the second set of wheels is different than each of the first set of wheels; an internal combustion engine that drives the first set of wheels; a generator, wherein the generator is powered by the internal combustion engine; an inverter connected to an output of the generator; an AC motor connected to an output of the inverter, wherein the AC motor drives the second set of wheels; a required motor power calculator that calculates a motor power required by the AC motor to produce a desired torque at the second set of wheels; a generator controller that controls the generator based on the required motor power; a potential power output calculator that calculates a potential power output by the generator based on generating status of the generator; and a motor controller that controls the AC motor by controlling the inverter based on the smaller of the required motor power and the potential power output.

Another embodiment is directed to a vehicle comprising a first set of wheels; a second set of wheels, wherein each of the second set of wheels is different than each of the first set of wheels; an internal combustion engine that drives the first set of wheels; a generator, wherein the generator is powered by the internal combustion engine; an inverter connected to an output of the generator; an AC motor connected to an output of the inverter, wherein the AC motor drives the second set of wheels; a primary torque command value calculator that calculates a primary torque command value for the AC motor based on a desired torque for the second set of wheels; a required motor power calculator that calculates a motor power required by the AC motor to produce a desired torque at the second set of wheels; a generator controller that controls the generator based on the primary torque command value; a potential power output calculator that calculates a potential power output by the generator based on a current generating status of the generator; a secondary torque command value calculator that calculates a secondary torque command value for the AC motor based on the potential power output; and a motor controller that controls the inverter based on the smaller of the primary torque command value and the secondary torque command value.

In an embodiment, a method for controlling torque for a vehicle is described. The vehicle has a first set of wheels, a second set of wheels, wherein each of the second set of wheels is different than each of the first set of wheels, an internal combustion engine that drives the first set of wheels, a generator, wherein the generator is powered by the internal combustion engine, an inverter connected to an output of the generator, and an AC motor connected to an output of the inverter, wherein the AC motor drives the second set of wheels. The method comprises determining a desired torque for the second set of wheels, calculating a potential power output of the generator; and operating the AC motor according to the smaller of the desired torque and the potential power output.

According to another embodiment, a vehicle comprises a first set of wheels; a second set of wheels, wherein each of the second set of wheels is different than each of the first set of wheels; an internal combustion engine that drives the first set of wheels; a generator, wherein the generator is powered by the internal combustion engine; an inverter connected to an output of the generator; an alternating current (AC) motor connected to an output of the inverter, wherein the AC motor drives the second set of wheels; a means for determining a maximum potential power output of the generator; a means for determining a desired power output of the AC motor; and a means for selecting a power output of the AC motor according to the smaller of the maximum potential power output of the generator and the desired power output of the AC motor.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
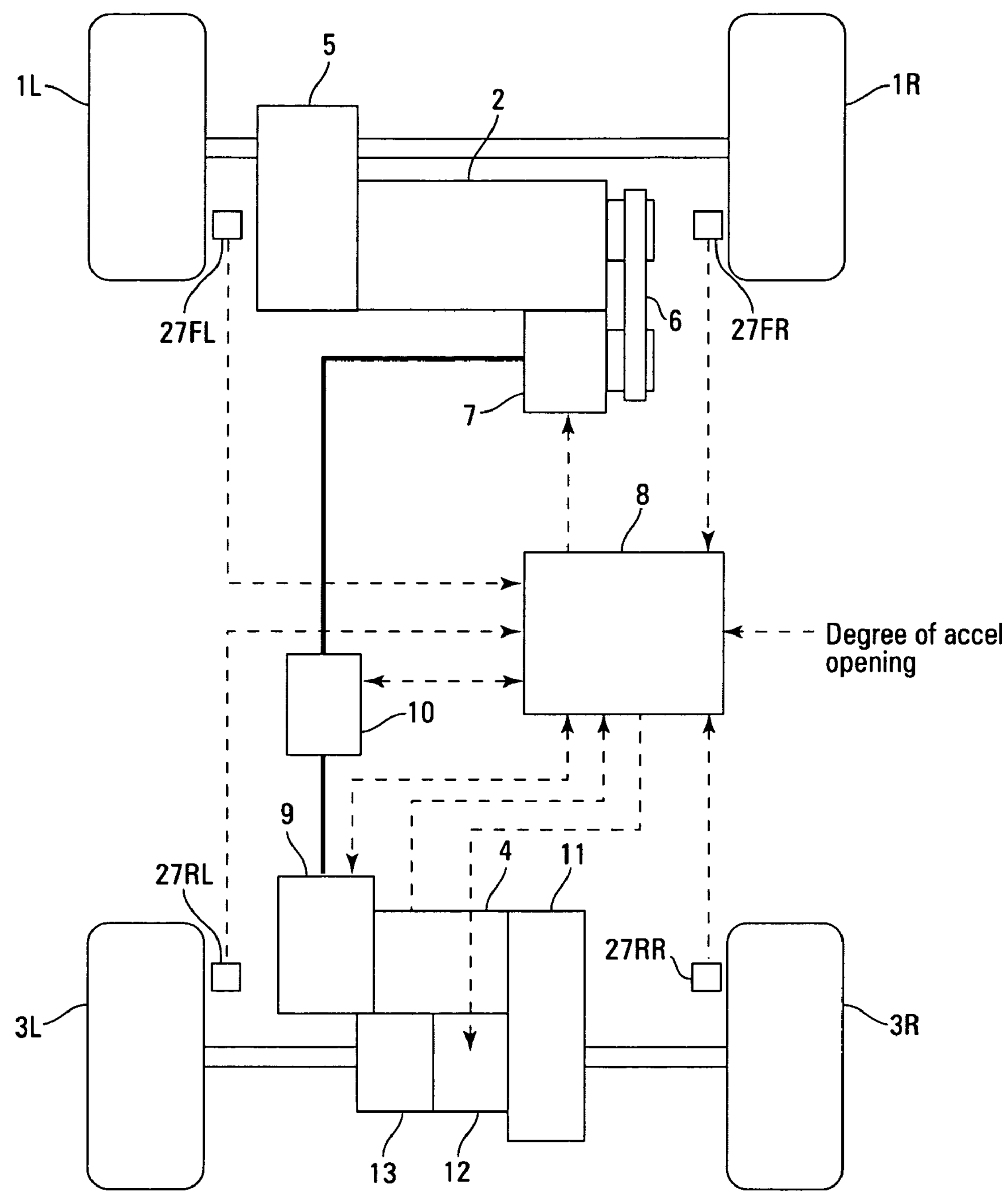
FIG. 1 is a figure showing an exemplary four-wheel drive system.

FIG. 1 shows an exemplary embodiment in which the present invention is applied to a four wheel drive vehicle. As shown in FIG. 1, the vehicle in this embodiment has left/right front wheels 1L, 1R that are the main drive wheels driven by the engine 2 that is an internal combustion engine and left/right rear wheels 3L, 3R that are the secondary drive wheels that can be driven by the motor 4.

There is a main throttle valve and a sub-throttle valve inside the intake passage of the engine 2. The main throttle valve modulates the amount of throttle opening corresponding to the amount of pressure on the accelerator. The sub-throttle valve modulates the amount of opening by the rotational angle corresponding to the steps on the step motor actuator. The amount of throttle opening on the sub-throttle valve is modulated to be less than the amount of main throttle valve opening so is independent from the operation of the accelerator by the operator and can decrease the engine output torque. Basically, modulation of the opening of the sub-throttle valve is controlled by the torque exerted on the front wheel 1L, 1R acceleration slip.

The output torque Te of the engine 2 is transmitted to the left/right front wheels 1L, 1R via the transmission and differential gear 5. Also, a portion of the output torque Te of the engine 2 is transmitted to the generator 7 via the endless belt 6 so the generator 7 rotates at Ng revolutions relative to the pulley ration on the engine 2 Ne revolutions. The generator 7 is subject to a load relative to the engine 2 corresponding to the field current Ifg modulated by the 4WD controller 8 and generates power according to the torque load. The amount of power generated by this generator 7 is determined by the size of the revolutions Ng and the field current Ifg. The revolutions Ng on the generator 7 are calculated based on the pulley ratio from the engine revolutions Ne.

Figure 2B:
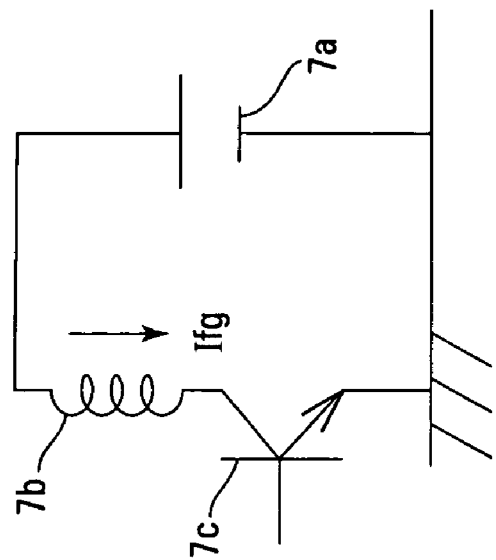
FIG. 2B is a figure showing the structure of a field current generator for a battery.
Figure 2A:
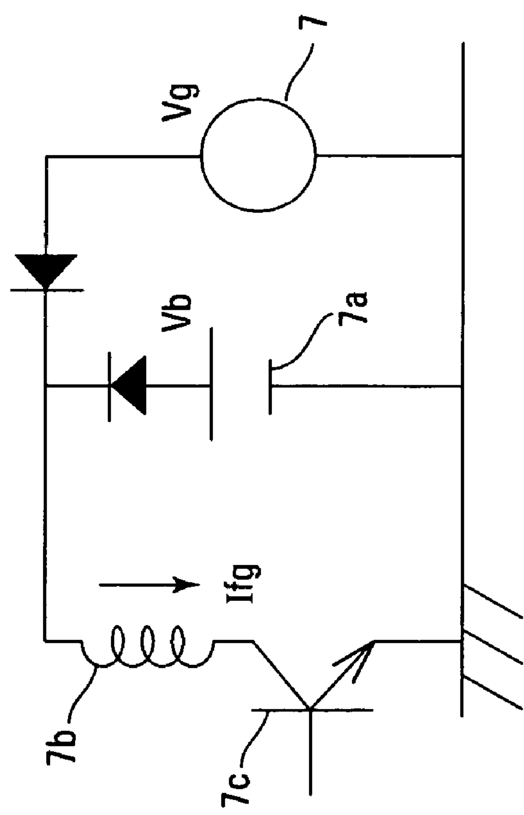
FIG. 2A is a figure showing the structure of a field current drive circuit for a generator and a battery.

FIG. 2A is a figure showing the structure of the field current drive circuit for the generator 7. This circuit corresponds to a structure that selects the specific voltage power and generator output voltage such as that in a 14 volt battery 7*a* of a vehicle as the field current power. The plus side of the field current power is connected to the field coil 78*b* and is constructed for switching the transistor 7*c*. In this case, if the generator output is lower than the battery voltage Vb, it becomes an externally excited region and the battery voltage Vb becomes the power source for the field coil 7*b* and if the output voltage Vg from an increase in the generator output is greater than the battery voltage Vb, it becomes a self-excited region and the output voltage Vg for the generator is selected and becomes the field coil 7*b* power source. Since the field current value can be increased by the generator power voltage, it is possible to dramatically increase the generator output.

As shown in FIG. 2B, the field current drive circuit can apply only to the 14 volt battery 7*a* of a vehicle (only the externally excited region) as a field current power source. The power generated by the generator 7 can be supplied to the motor 4 via the junction box 10 and the inverter 9. The drive axle of the motor 4 can be connected to the rear wheels 3L, 3R via the reduction gear 11 and clutch 12. The motor 4 in this embodiment is an alternating current motor. In the figure, symbol 13 is the differential gear.

Figure 13:
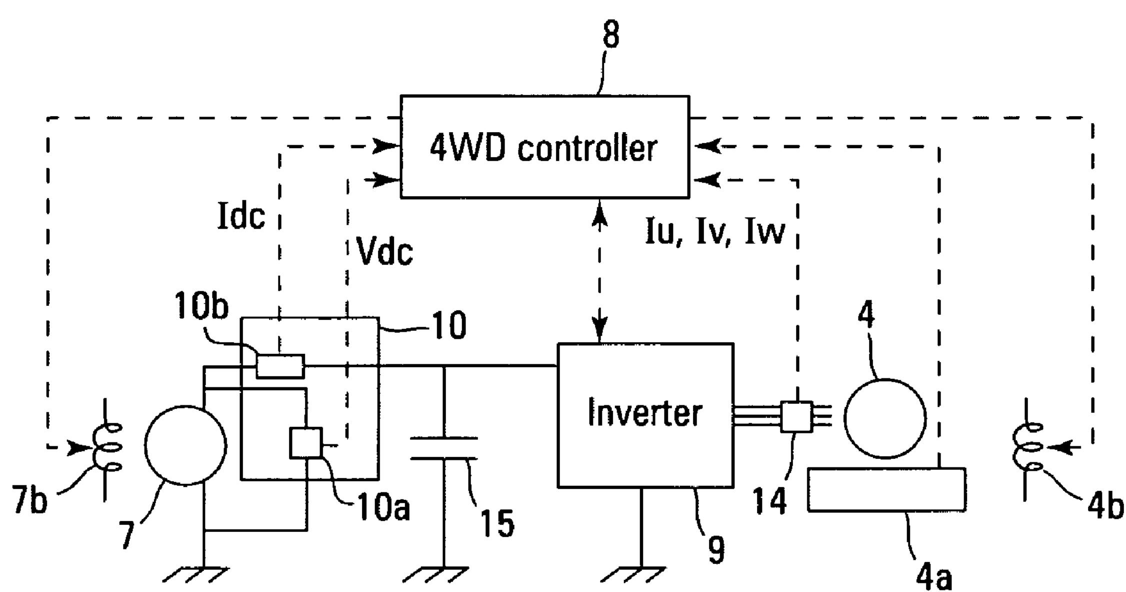
FIG. 13 is a block figure showing the structure of the generator, inverter and motor from FIG. 1.

There is a relay that connects/disconnects the inverter 9 and the generator 7 inside the junction box 10. Also, when this relay is connected, the direct current power supplied from the generator 7 via the rectifier not shown in the figure drives the motor 4 using conversion to a three-phase alternating current inside the inverter 9. Additionally, as shown in FIG. 13, the three-phase alternating current sensor 14 that detects the three-phase alternating current that is the inverter 9 output current is positioned between the inverter 9 and the motor 4. The detection signal from this three-phase alternating current sensor 14 is output to the 4WD controller.

Also, as shown in FIG. 13, inside the junction box 10, there is a generator voltage sensor 10*a* that detects the generated voltage and a generator current sensor 10*b* that detects the generated current that is the input current for the inverter 9 and these detection signals are output to the 4WD controller 8. There is a capacitor 15 between the generator current sensor 10*b* and the inverter 9. There is a resolver 4*a* attached to the drive axle of the motor 4. According to signals from the control module IC positioned on the 4WD controller 8 but not shown in the figures, the resolver 4*a* replies to the control module IC with signals containing information on the number of motor revolutions and information on the pole position. The control module IC outputs pulse signals based on the signals transmitted to the motor revolutions calculator 310 in the motor controller 8F described later. The motor revolutions calculator 310 calculates the number of motor revolutions Nm based on the pulse signals and outputs them to each part. Additionally, the motor 4 is equipped with a field coil 4*b*.

If the clutch 12 is a wet type multiple disc clutch, it is engaged and released according to commands from the 4WD controller 8. In this embodiment, the means to engage the clutch was a wet type multiple disc clutch but it could also be a powder clutch or pump clutch. There is a wheel velocity sensor 27FL, 27FR, 27RL, 27RR on each wheel 1L, 1R, 3L, 3R. Each wheel velocity sensor 27FL, 27FR, 27RL, 27RR outputs the pulse signals corresponding to the revolution speed of the corresponding wheel 1L, 1R, 3L, 3R to the 4WD controller 8 as wheel velocity detection values.

The 4WD controller 8 is constructed with a calculation processing device such as a microcomputer where the wheel velocity signals detected by each of the wheel velocity sensors 27FL~27RR, the output signals from the voltage sensors and the current sensors in the junction box 10, the output signals from the control module connected to the motor 4 and the amount of accelerator opening corresponding to the pressure on the accelerator (not shown in the figures) are input.

Figure 3:
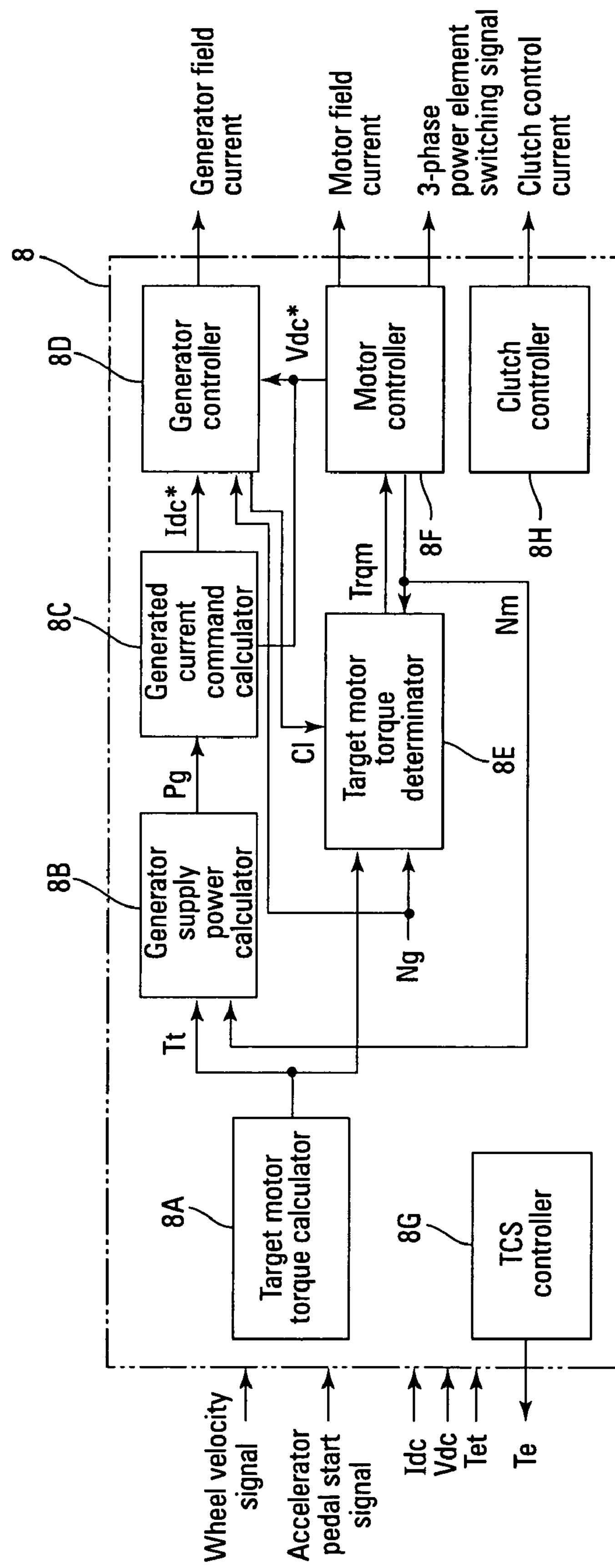
FIG. 3 is a block figure showing details of the 4WD controller from FIG. 1.

As shown in FIG. 3, the 4WD controller 8 is equipped with a target motor torque calculator 8A, a generator supply power calculator 8B that acts as the required motor power calculation means, a generated current command calculator 8C, a generator controller 8D that acts as the generator control means, a target motor torque determinator 8E, a motor controller 8F that acts as the motor control means, a TCS controller 8G, and a clutch controller 8H. The target motor torque calculator 8A calculates the motor torque command value Tt from the torque required for the rear wheels 3L, 3R for the secondary drive wheels, such as the front/rear wheel velocity difference calculated based on wheel velocity signals for the four wheels and the signals for the amount of accelerator pedal opening.

The generator supply power calculator 8B calculates the generator supply power Pg according to the following formula, based on the torque command value Tt and the number of motor revolutions Nm.

$$Pg=Tt\times Nm/Иm \qquad (1)$$

И is the inverter efficiency. The generator supply power Pg becomes the inverter efficiency Иm that is higher than the power Pm(=Tt×Nm) required by the motor that is obtained from the product of the torque command value Tt and the number of motor revolutions Иm. Additionally, the number of motor revolutions Nm is calculated by the motor controller 8F described later, based on the pole position signal Θ. The generated current command calculator 8C calculates the generated current command value Idc* according to the following formula, based on the generator supply power Pg calculated by the generator supply power calculator 8B and the generated voltage command value Vdc* calculated by the motor controller 8F to be described later.

$$Idc^*=Pg/Vdc^* \qquad (2)$$

Figure 4:
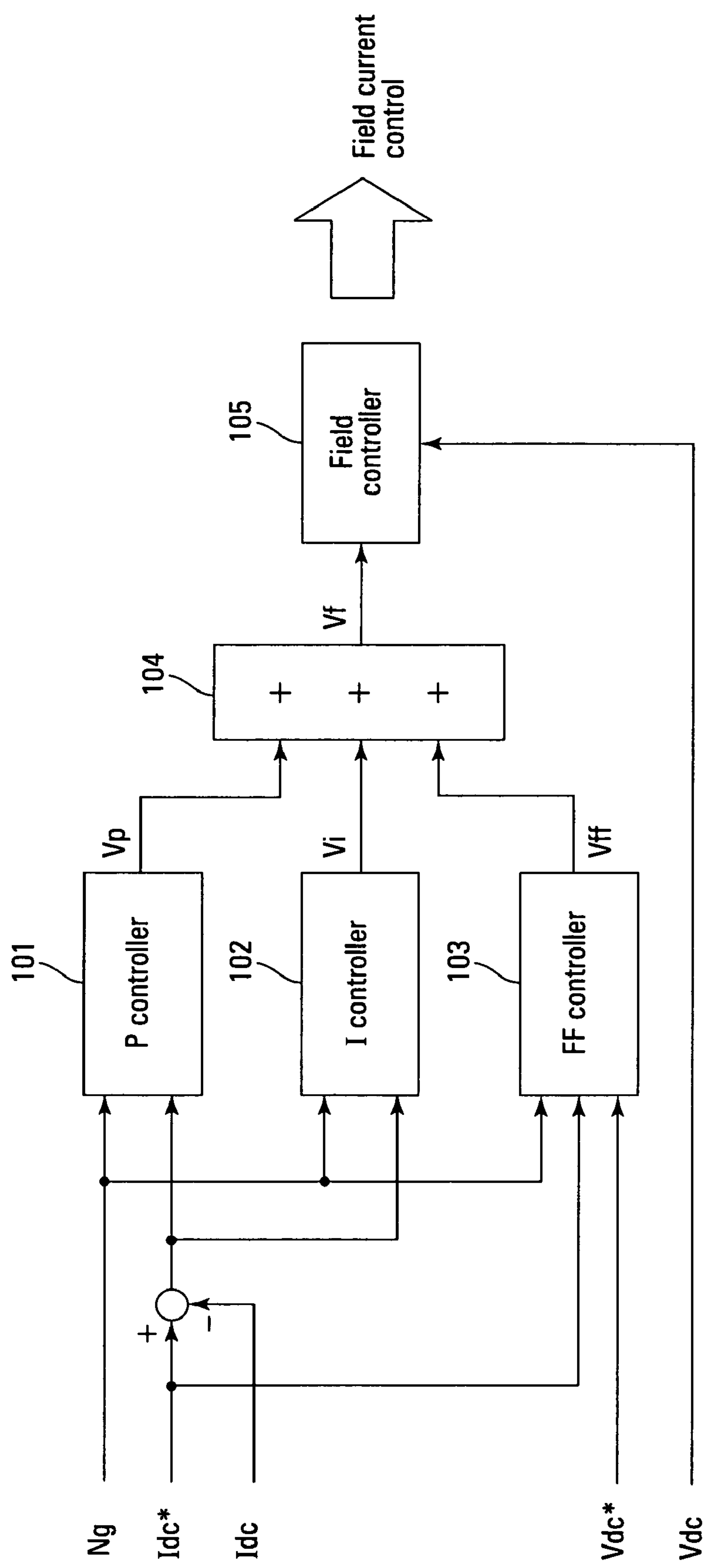
FIG. 4 is a block figure showing details of the generator controller from FIG. 3.

FIG. 4 is a block figure showing details of the generator controller 8D that performs generator control for the generator 7. Here, the generator controller 8D is constructed of a P controller 101, an I controller 102, a FF controller 103, a control volume addition part 104 and a field controller 105. The field voltage PWM duty ratio C1 is determined and PWM control performed on the generator 7 field current Ifg. P control is conducted on the P controller 101 based on the deviation between the generated current command value Idc* calculated according to the formula (2) and the actual generated current value Idc. First, the deviation between the generated current command value Idc* and the actual generated current value Idc is multiplied by a specific gain. Then, to fix the gain sensitivity relative to the change in generator revolutions, this value is multiplied by the reciprocal of the number of generator revolutions Ng. This is output to the control volume addition part 104 described later as the control volume Vp for P control.

I control is conducted on the I controller 102 based on the deviation between the generated current command value Idc* calculated according to the formula (2) and the actual generated current value Idc. Basically, integral calculus is performed on the deviation between the generated current command value Idc* and the actual generated current value Idc. Here the integral value contains the values for the upper limit and the lower limit. Additionally, in the same manner as with P control above, this integral value is multiplied by the reciprocal of the number of generator revolutions Ng and this is output to the control volume addition part 104 described later as the control volume Vi for I control.

Figure 5:
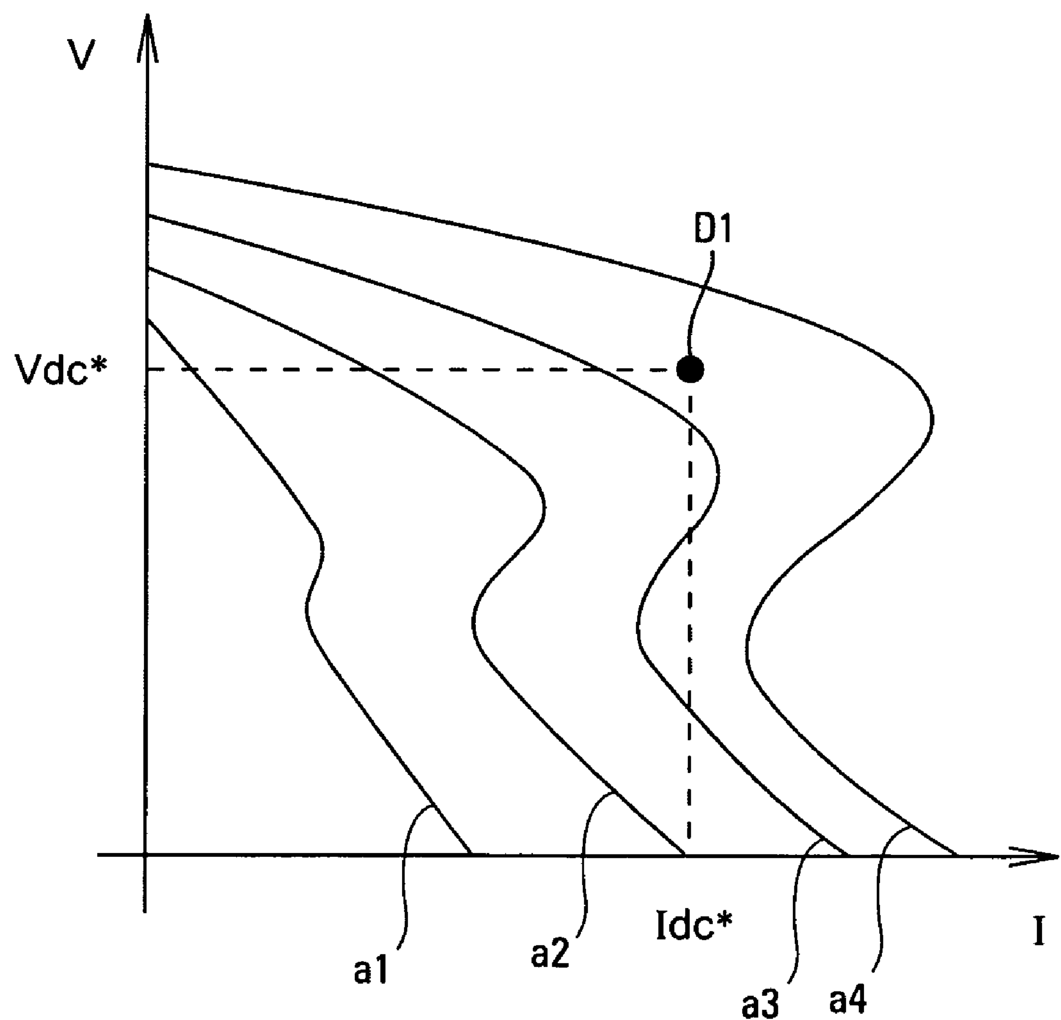
FIG. 5 is a generator properties map for each revolution.

As shown in FIG. 5, the FF controller 103 is referenced on a generator properties map for each revolution. The generator field voltage PWM duty ratio D1 is determined by feed forward based on the generated voltage command value Vdc* and the generated current command value Idc*. In FIG. 5, the field voltage PWM duty ratio D1 is fixed for the self-excitation region of the generator 7 and there is a locus for the movement points when the generator 7 load is gradually altered, so curved lines a1~a4 show the differences in the duty ratio D1.

The control volume Vff for FF control is calculated according to the following formula based on the PWM duty ratio D1 and the generated voltage command value Vdc*, and output to the control volume addition part 104.

$$Vff=D1\times Vdc^*$$

In this embodiment, the description is made for calculating the control volume Vff based on the PWM duty ratio D1 and the generated voltage command value Vdc* but is not limited to this. The control volume Vff can be calculated based on the field current If for the generator 7 and the field coil resistance Rf.

Figure 6:
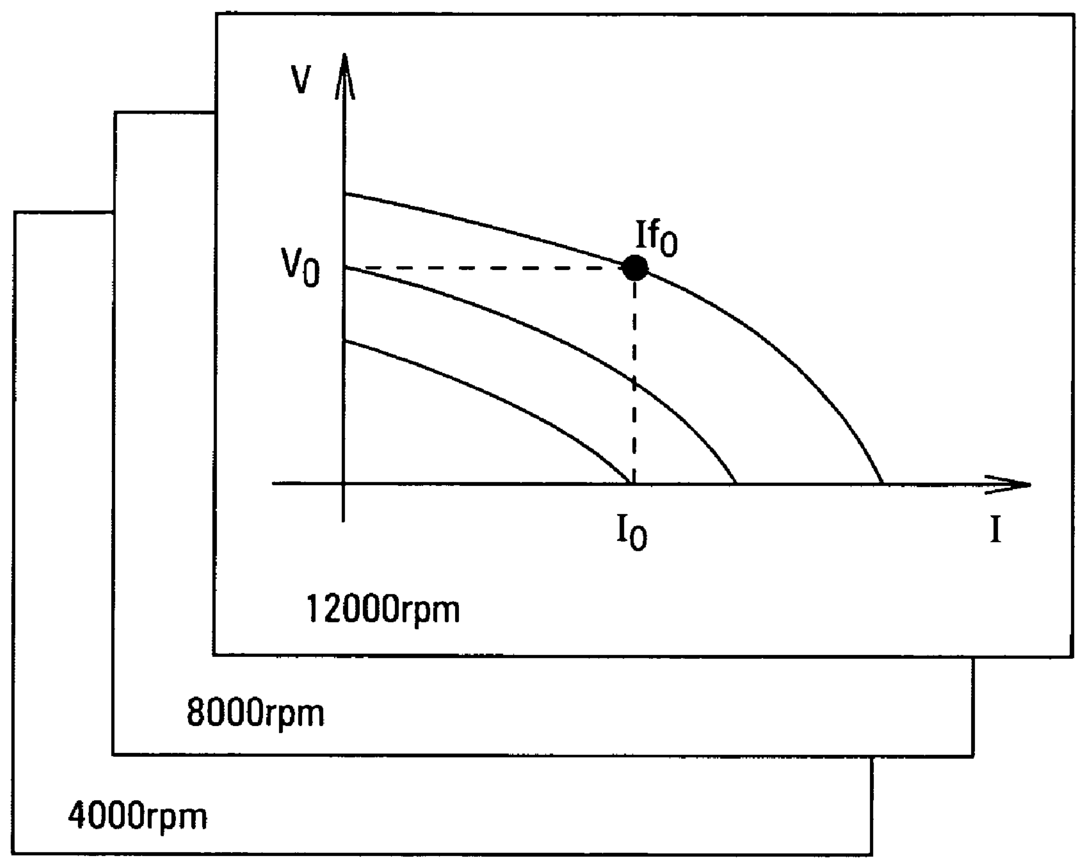
FIG. 6 is a field current properties map for each revolution.

In this case, first, the map with the number of motor revolutions Nm and torque command value Tt is referenced and the required generated voltage Vo and the required generated current Io needed by the generator 7 is calculated. As shown in FIG. 6, these are referenced on the field current properties map for the generator 7 for each revolution, and the required field current Ifo is calculated. In this manner, the control volume Vff can be calculated according to Vff=Ifo xRf based on the required field current Ifo calculated.

The control volume addition part 104 adds the control volume Vp, the control volume Vi and the control volume Vff. This is output to the field controller 105 as voltage Vf for the field coil. The field controller 105 determines whether or not the actual generated voltage value Vdc is less than the battery voltage Vb as the generator 7 field current power source. If Vdc≦Vb, the field voltage PWM duty ratio C1 is calculated according to the following formula (4).

$$C1=Vf/Vb \qquad (4)$$

On the other hand, if Vdc>Vb, the field voltage PWM duty ratio C 1 is calculated according to the following formula (5).

$$C1=Vf/Vdc \qquad (5)$$

Thus, the generator 7 field current Ifg is controlled according to the duty ratio C1 calculated in this manner.

With this generator controller 8D, the generator movement points to actualize the generator supply power Pg determined from the torque command value Tt can be designated by feed forward, and the feedback from the PI compensation for the deviation between the generated current command value Idc* and the actual generated current value Idc allows the actual generated current value Idc to follow the generated current command value Idc*. Therefore, the power corresponding to motor 4 requirements is supplied to the inverter 9 to control the generator 7 field current Ifg. Here, PI compensation is applied as the method of control using feedback control, but the invention is not limited to this, and control methods for a stable system are also acceptable.

When inverters are utilized, generator control responsiveness is low and motor control responsiveness with inverters is high. With this type of generator and inverter combination, existing devices have a slower increase in generator output during the process where the torque command is suddenly increased. Since the motor control functions according to the torque command output when the inverter input is insufficient, there is a problem with use of the generator when the electrical efficiency is poor due to low voltage, high current conditions.

In this embodiment, the target motor torque programmer 8E described later calculates the potential power output Pabl corresponding to the power Pg* needed by the motor 4 and the generating status of the generator 7. Based on the smaller of these powers, the motor controller 8F described later controls the motor 4. As a result, there is a balance between the power supplied by the generator and the power input to the inverter.

Figure 7:
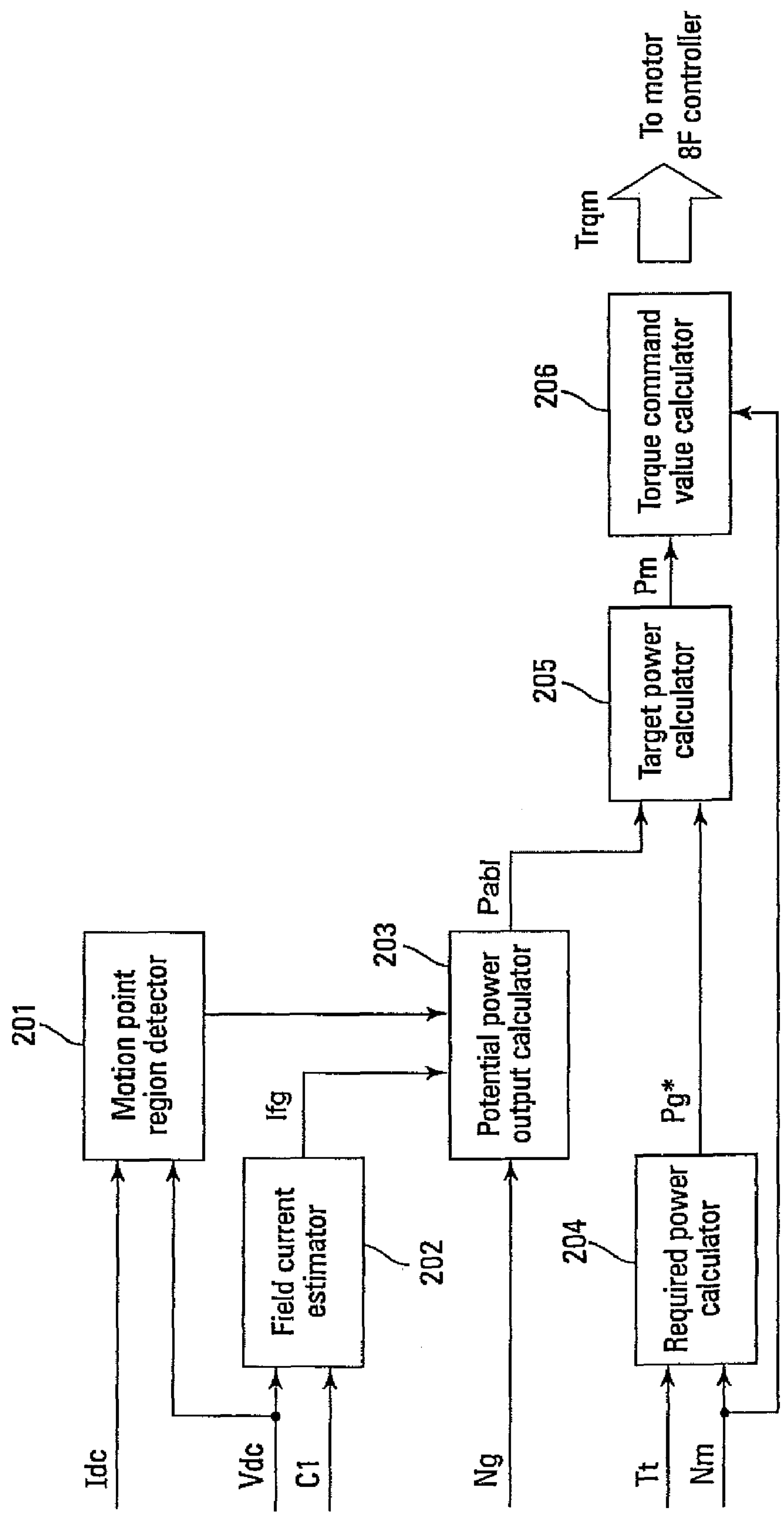
FIG. 7 is a block figure showing details of the target motor torque programmer from FIG. 3.

FIG. 7 is a block figure showing details of the target motor torque programmer 8E that determines the torque command value Trqm for motor control. The target motor torque programmer 8E is constructed of a motion point region detector 201 that acts as the region detection means, a field current estimator 202, a potential power output calculator 203 that acts as the potential power output calculator means, a required power calculator 204 that acts as the required motor power calculator means, a target power calculator 205 and a torque command value calculator 206, and calculates the torque command value Trqm that is output to the motor controller 8F described later. The target power calculator 205 and torque command value calculator 206 make up the torque command value calculator means.

Figure 8:
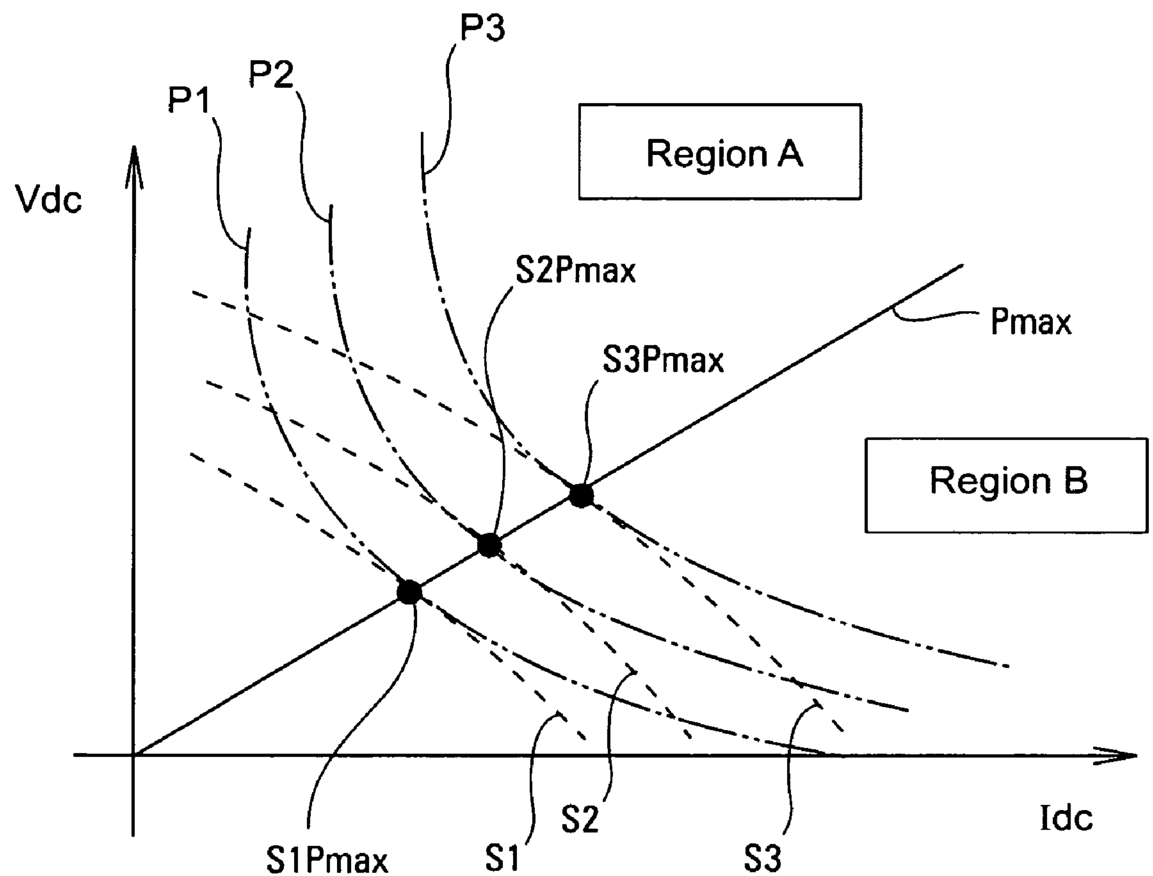
FIG. 8 is a motion point region map.

The motion point region detector 201 detects the region where generator 7 motion points exist based on the actual voltage Vdc generated by the generator 7 and the actual current Idc generated. As shown in FIG. 8, specifically, it references a motion point region map for detection. This motion point region map shows generated current on the horizontal axis and shows generated voltage on the vertical axis. It is divided into region A and region B according to the maximum power output Pmax shown by the line.

Curve S with the dotted lines is the generator output properties line (properties line of potential output for the generator) with parameters of generator revolution velocity ωg and field current Ifg. If revolution velocity of the generator 7 causes field current, the generator 7 generates voltage/current above the potential output properties line S. Also, curve P with the reverse shaped curve shown by dashed lines is an isoelectric line and the output power for generator 7 above this line is fixed. Basically, power output above potential output properties line S varies by motion point and the power output at motion points S1Pmax, S2 Pmax and S3P max where the potential output properties line S and the isoelectric line P intersect becomes the maximum power output above the potential output properties line S containing those motion points.

The maximum power output line Pmax is the line that connects with the points where the generator 7 power output is highest for motion points above each potential output properties line. Additionally, this maximum power output line Pmax is the dividing line between two regions and the power output for motion points above the potential output properties line S in region A increase according to increases in generated current while the region where it decreases according to increases in generated current is called region B. The detection results for this motion point region are output to the potential power output calculator 203 described later.

With the field current estimator 202, if Vdc≦Vb, the voltage Vf applied to the field coil is calculated based on the following formula (6), while if Vdc>Vb, the calculation is based on formula (7) as follows.

$$Vf=C1\times Vb \tag{6}$$

$$Vf=C1\times Vdc \tag{7}$$

Additionally, based on the voltage Vf calculated in this manner, the generator 7 field current Ifg is estimated based on the following formula and output to the potential power output calculator 203.

Figure 9:
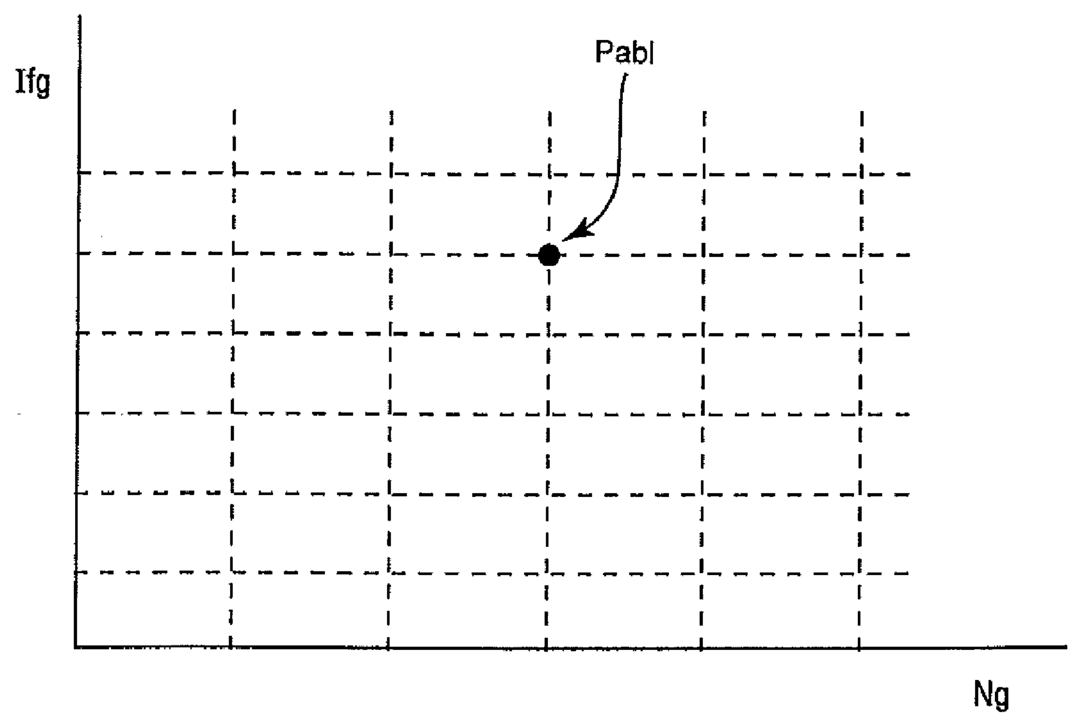
FIG. 9 is a potential power output calculation map.

The motion point regions detected with the motion point region detector 201, the field current Ifg estimated with the field current estimator 202 and the number of generator 7 revolutions Ng are input to the potential power output calculator 203 and the generator 7 calculates the potential power output Pabl that is the potential power output for the current generating status corresponding to the motion point region. If the generator 7 motion points are in region A, the potential power output calculation map shown in FIG. 9 is referenced and the generator 7 calculates the maximum potential power output for the current generating status as the potential power output Pabl. This potential power output calculation map is a two-dimensional map containing the number of generator 7 revolutions Ng, field current Ifg and the potential power output Pabl. The field current Ifg is on the horizontal axis and the number of revolutions Ng is on the vertical axis. Each lattice point in the figure has the potential power output Pabl determined from the number of revolutions Ng and the field current Ifg.

If the motion point for generator 7 is in region B, the power output P (=VdcxIdc) at the current motion point is calculated as the potential power output Pabl. The torque command value Tt and number of motor revolutions Nm are input into the required power calculator 204 and the required power Pg* is calculated according to the following formula.

$$Pg=Tt\times Nm/\text{И}_m \tag{9}$$

The required power Pg* calculated in this manner becomes the power necessary for the motor to generate the torque command value Tt.

The potential power output Pabl calculated by the potential power output calculator 203 and the required power Pg* calculated by the required power calculator 204 are input into the target power calculator 205 and the power to determine the motion point for the inverter 9, specifically the target power Pm for the motor 4 is calculated. The potential power output Pabl and the required power Pg* are subject to select low and the result is output to the torque command value calculator 206 as the target power Pm.

If the current motion point for generator 7 is in region A, during the current generating state, the maximum potential power output and the required power Pg* needed by the motor 4 are subject to select low and if the current generator 7 motion point is in region B, the current power output and required power needed by the motor 4 are subject to select low. The torque command value Trqm is calculated for motor control based on the target power Pm using the following formula, and then output to the motor controller 8F.

$$Trqm=Pm\times \text{И}_{m/Nm} \tag{10}$$

Figure 10:
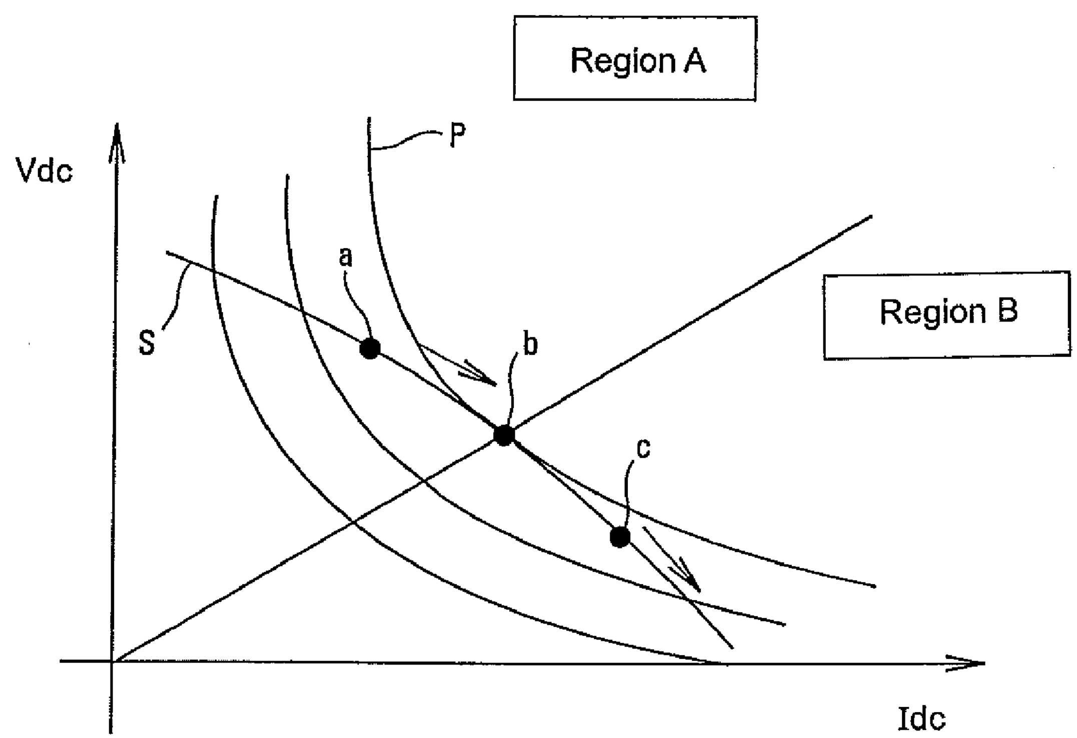
FIG. 10 is a figure describing the movement of the motion points by load changes on the inverter side.

For example, as shown in FIG. 10, the motion point is at point a (region A) above the potential output properties line S. At this point, to move the current motion point a to motion point b that can output the maximum power above the potential output properties line S, the torque corresponding to this maximum output, specifically the torque corresponding to the set power line P is given as a command. This increases the generated current by reducing the load on the inverter side and since the power output increases, this results in the motion point moving from a in the direction of b.

On the other hand, if the current motion point is point c (region B) above the potential output properties line S, to move the this motion point c to motion point b, the torque corresponding to the set power line P is given as a command and this increases the generated current on the inverter side in the same manner as when the current motion point was at point a and so the motion point can output the maximum power without moving to motion point b, it shifts to the bottom right of the figure and becomes excess current/low voltage.

Thus, in this embodiment, the potential power output Pabl and the required power Pg* are subject to select low, and if the current motion point is in region A and the power output for generator 7 is less than the required power Pg*, in the current generating state, the maximum power output is output and a drop in voltage is prevented by the insufficient power. Additionally, in the current generating state, torque is generated at the motion point with high efficiency. Also, if the current motion point is in region B and the power output for generator 7 is less than the required power Pg*, in the current generating state, the maximum power output is not output and the current output power is maintained to prevent a drop in voltage.

Figure 11:
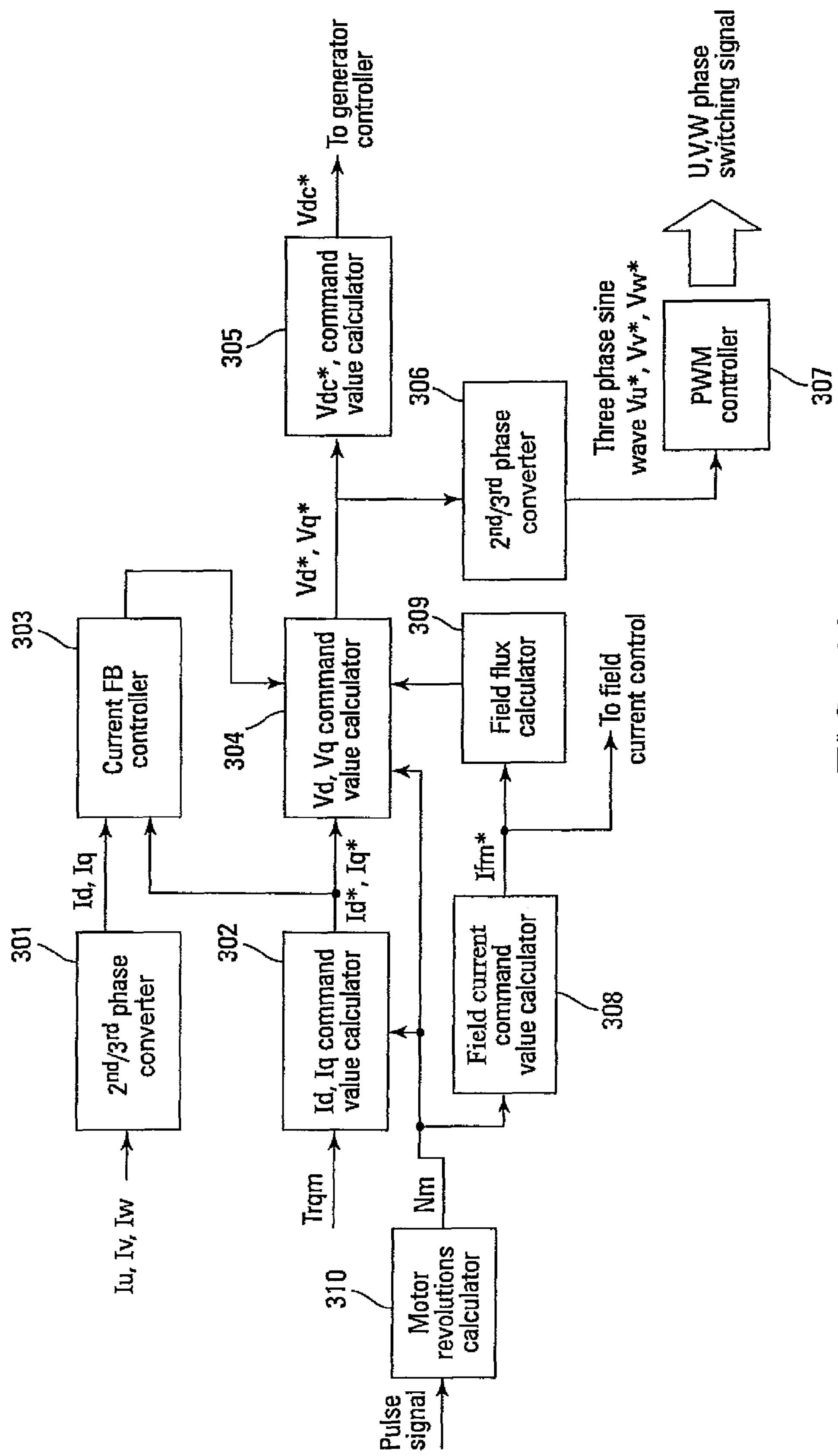
FIG. 11 is a block figure showing details of the motor controller from FIG. 3.

FIG. 7 is comprised of a potential power output calculator means with a motion point region detector 201 and potential power output calculator 203. FIG. 11 is a block figure showing details of the motor controller 8F that controls the motor 4 with the inverter 9. The motor controller 8F is constructed of a $2^{nd}/3^{rd}$ phase converter 301, an Id, Iq command value calculator 302, a current FB controller 303, a Vd, Vq command value calculator 304, a Vdc* command value calculator 305, a $2^{nd}/3^{rd}$ phase converter 306, a PWM controller 307, a field current command value calculator 308 and a field flux calculator 309. The torque command value Trqm calculated by the target motor torque programmer 8E is input and the actual motor torque T controls the switching of the $3^{rd}$ phase power element of the inverter 9 according to the torque command value Trqm.

With the $2^{nd}/3^{rd}$ phase converter 301, the U-phase current value Iu, the V-phase current value Iv and the W-phase current value Iw that are the $3^{rd}$ phase alternating current values detected by the current sensor are converted to the d axis current value Id and the q axis current value Iq that are the $2^{nd}$ phase direct current values and are output to the current FB controller 302. With the Id, Iq command value calculator 302, to output the torque conforming with the torque command value Trqm based on the torque command value Trqm and the number of motor revolutions Nm, the command values Id*, Iq* for the d axis current and the q axis current are calculated and output to the current FB controller 303 and Vd, Vq command value calculator 304.

With the current FB controller 303, PI control is executed relative to the deviation between the current values Id, Iq input from the $2^{nd}/3^{rd}$ phase converter 301 and the current command values Id*, Iq* input from the Id, Iq command value calculator 302, and fed back to the Vd, Vq command value calculator 304. With the Vd, Vq command value calculator 304, the d axis voltage command value Vd* to make the d axis current value Id into the d axis current command value Id* and the q axis voltage command value Vq* to make the q axis current value Idq into the q axis current command value iq* are calculated based on the current command values Id*, Iq* input from the Id, Iq command value calculator 302, the feedback values input from the current FB controller 303, the number of motor revolutions Nm and the motor parameters (inductance and field flux) input from the field flux calculator 309 described later.

With the Vdc* command value calculator 305, the generated voltage command value Vdc* is calculated based on the voltage command value Vd*, Vq* calculated by the Vd, Vq command value calculator 304 and is output to the generator controller 8D from FIG. 4 that was described earlier. With the $2^{nd}/3^{rd}$ phase converter 306, the dq axis voltage command values Vd*, Vq* are converted to 3-phase sine wave command values that are the 3-phase coordinates of U-phase voltage command value Vu*, V-phase voltage command value Vv* and W-phase voltage command value Vw*, and then output to the amplitude compensator (PWM controller) 307.

With the PWM controller 307, the PWM command is calculated by comparing the 3-phase sine wave command values input from the $2^{nd}/3^{rd}$ phase converter 306 and triangular waves, which generates the switching signals output to the inverter 9. The inverter 9 generates a PWM wave voltage corresponding to the switching signals and applies it to the motor, which drives the motor 4. Additionally, with the field current command value calculator 308, the field current command value Ifm* is calculated based on the number of motor revolutions Nm and is output to the field flux calculator 309. The field flux is calculated by this field flux calculator 309 and output to the Vd, Vq command value calculator 304 described previously.

The TCS controller 8G in FIG. 3 performs front wheel traction control by sending back the engine output torque Te for ECM using a standard method based on the engine generated drive torque demand signal Tet from the engine torque controller (ECM) not shown in the figure, the revolution velocity of the left/right front wheels $V_{FR}$, $V_{FL}$, and the velocity V. The clutch controller 8H controls the clutch 12 state and controls the connection state of the clutch 12 when in a four wheel drive state.

Figure 12:
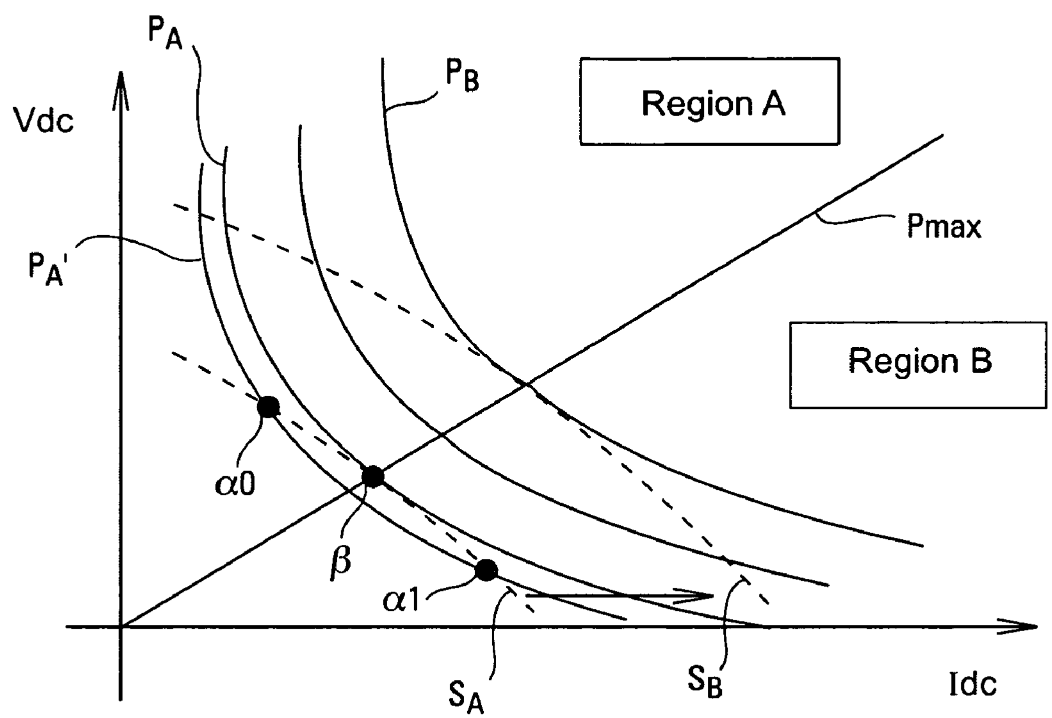
FIG. 12 is a figure describing the operation of the embodiment.

Next is a description of the operation of this embodiment. At the present time, the motor torque command value Tt surges based on the wheel velocity and the amount of accelerator opening. In this case, as shown by the properties drawing for the generator 7 in FIG. 12, the generator supply power Pg is calculated by the generator supply power calculator 8B based on the torque command value Tt and the number of motor revolutions Nm. The fixed power line equivalent to the generator supply power Pg is shown by the curve $P_B$. Additionally, PI control is executed by the generator controller 8D for the deviation between the generated current command value Idc* calculated from the generator supply power Pg and the actual generated current value Idc. The generator 7 field current Ifg is controlled such that the actual generated current value Idc follows the generated current command value Idc*. At this point, as shown by the properties drawing for the generator 12 in FIG. 12, the potential output properties line gradually moves from the existing potential output properties line $S_A$ to the target potential output properties line $S_B$.

With the target motor torque programmer 8E, the torque command value Trqm is calculated for motor control according to the required power Pg* and current generator 7 generating state. Then the motion point for the generator 7 becomes point a on the potential output properties line $S_A$ and the motion point region is that of region A so the smaller value of the potential power output Pabl calculated by the potential power output calculator 203 based on the potential power output calculation map shown in FIG. 9 or the required power Pg* calculated by the required power calculator 204 is calculated as the motor 4 target power Pm. The fixed power line corresponding to the potential power output Pabl is shown by the curve $P_A$, and the fixed power line corresponding to the required power Pg* is shown by the curve $P_B$. Since Pabl<Pg, the potential power output Pabl is assigned as the target power Pm and the torque corresponding to this target power Pm is output as the torque command value Trqm.

With the motor controller 8F, the 3-phase sine wave command is calculated for switching control of the inverter 9 3-phase power element based on this torque command value Trqm and number of motor revolutions Nm. The PWM command is calculated based on this 3-phase sine wave command and output to the inverter 9. Therefore, the generator 7 is driven at motion point β where it is possible to output the potential power output Pabl that is the maximum potential power output above the potential output properties line $S_A$. The motor generates torque equivalent to the potential power output Pabl.

As indicated previously, since the control responsiveness of the generator is low, the generator potential output properties line does not quickly become the target potential output properties line $S_B$. If the potential output properties line is $S_A$, and the output is insufficient, a torque command value Tt is generated and the motion point moves from $\alpha_0$ to a motion point with poor efficiency at the bottom right of the figure. However, if the required power Pg* is greater than the potential power output Pabl, motor control in this embodiment is performed based on the torque command value Trqm calculated according to the generator 7 generating status. Therefore, the inverter consumed power correlates to the generator existing potential power output so a drop in voltage can be prevented by insufficient power.

If the existing generator 7 motion point is at point above $\alpha_1$ on the potential output properties line is $S_A$, the motion point region is in region B so the smaller value between the existing motion point output power P and the required power Pg* is calculated as the motor 4 target power Pm. The fixed power line corresponding to output power P is shown by the curved line $P_A'$. Since P<Pg*, the power output P is assigned as the target power Pm and based on the torque command value Trqm corresponding to this target power Pm performs motor control. Therefore, the generator 7 is driven at the existing motion point $\alpha_1$ above the potential output properties line $S_A$ and torque equivalent to the power output P is generated.

If the motion point is in region B, if the greatest power on the existing potential output properties line can be moved with output from motion point β, the load on the inverter side is reduced which increases the generated current. As a result, it drops to a motion point with poor efficiency. However, if the generator 7 motion point is in region B, as found in this embodiment, the power output P and the required power Pg* at the existing motion point are subject to select low so if the power output is less than the required power, the generated amount at that point is maintained, which prevents the motion point from moving in the direction of poor efficiency.

In this embodiment, the torque command value is determined for motor control based on the current generating status of the generator. Therefore, the inverter power consumption can be correlated with the power generated and thus it is possible to prevent a drop in generated voltage due to insufficient power. Based on the current generating status for the generator, the generator calculates the potential power output and the smaller value of this potential power output and the required power for the motor correlates to a torque command value that performs motor control. Therefore, if the generated power is less than the required power, the motor is controlled to generate the torque corresponding to the potential power output, which effectively prevents a drop in generated voltage due to insufficient power.

By calculating the potential power output corresponding to the current generator motion point region, if the motion point exists in a region where the generated power increases as the generated current increases, the maximum power that can be output at the current generating state is calculated as the potential power output and the generator can operate efficiently. Additionally, if in a region where the generated power decreases along with an increase in generated current, the existing power output is calculated as the potential power output so the voltage drops when the maximum potential power output is generated, which avoids problems in operating at motion points with poor efficiency. The generator field current is estimated and the maximum potential power output for the generator is calculated from the estimated field current value so the consumed inverter power precisely correlates to the generator output.

In the embodiment, it is acceptable to assign a margin with the potential power output calculator 203 to the potential power output Pabl calculated by the potential power output calculation map shown in FIG. 9. This margin is a safety rate assigned to allow for generator 7 product variation and a correction coefficient K (such as 0.9) can be set to the potential power output Pabl. The safety rate has been considered in advance and can be used to create the potential power output map. Therefore, depending on the generator product status, even if there is a state where the potential power cannot be output, in reality, it is possible to output power exceeding the output amount, which avoids a drop in generated voltage.

In this embodiment, a description was given for when the field current Ifb was estimated using the field current estimator 202 based on the formula (8), but this is not limited to such and the current flowing through the generator 7 field coil can be directly detected with the current sensor. Additionally, in the embodiment, the direct torque command value Trqm can be calculated with the target motor torque programmer 8E based on the current power output of the generator 7. In this case, the current power output P=VdcxIdc is calculated based on the generated voltage Vdc detected with the generator voltage sensor and the generated current Idc detected with the generator current sensor and the torque command value Trqm=PxИm/Nm based on the power output P. Thus, the consumed inverter power corresponds to the existing generator output to maintain the motion of the existing motion point and accurately prevent a drop in voltage.

Figure 14:
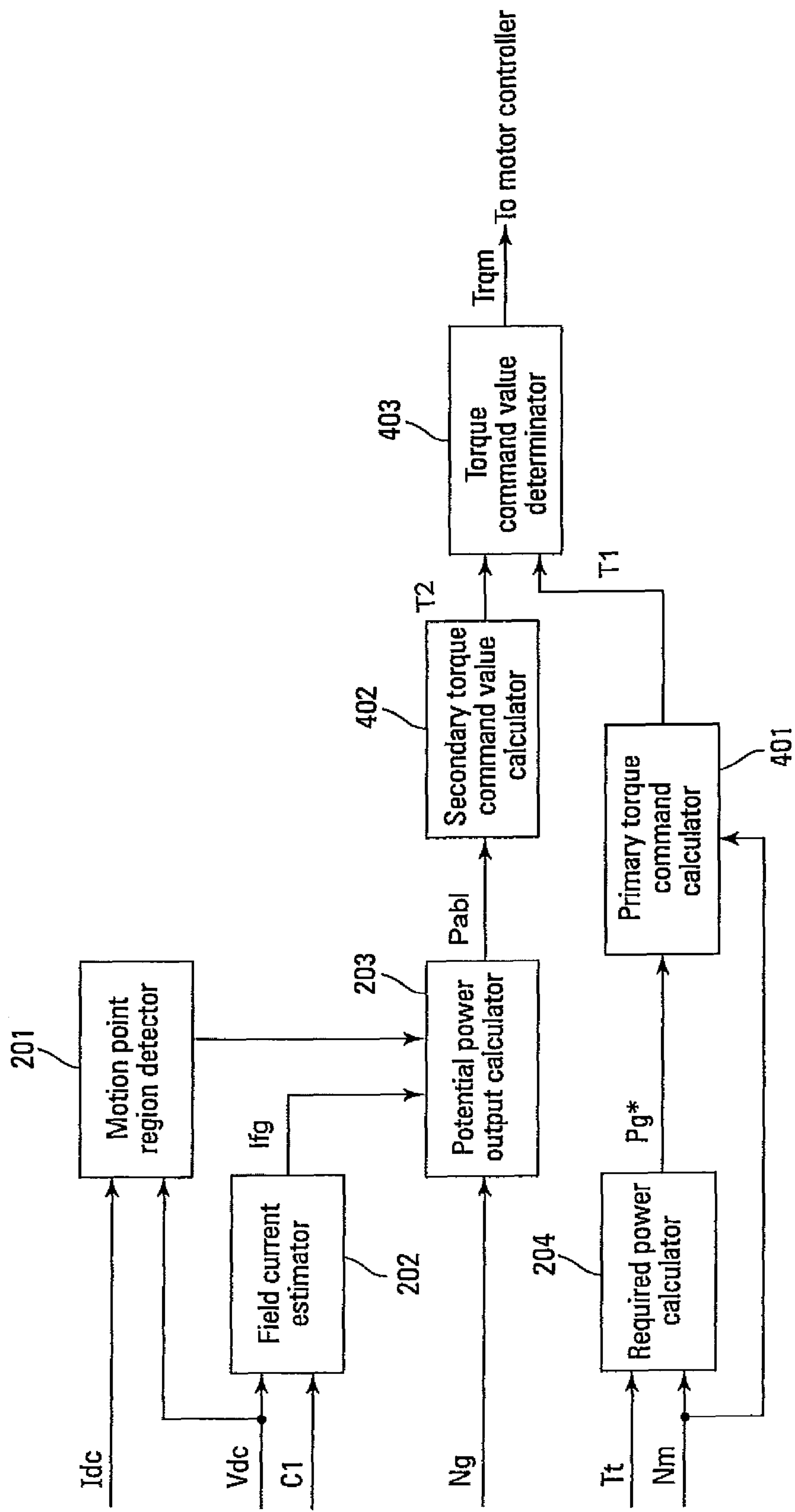
FIG. 14 is a block diagram of a target motor torque programmer according to another embodiment.

Another embodiment is shown in FIG. 14. As shown in FIG. 14, the target motor torque programmer 8E for another embodiment is equipped with a primary torque command value calculator 401, secondary torque command value calculator 402 and a torque command value programmer 403 instead of a target power calculator 205 and a torque command value calculator 206. The primary torque command value calculator 401 calculates the primary torque command value T1 based on the required motor power Pg* calculated by the required power calculator 204 and outputs this to the torque command value programmer 403. The secondary torque command value calculator 402 calculates the secondary torque command value T2 based on the potential power output Pabl calculated by the potential power output calculator 203 and outputs this to the torque command value programmer 403. With the torque command value programmer, the primary torque command value T1 and the secondary torque command value T2 are subject to select low and the resulting torque command value Trqm is output to the motor controller 8F. In this manner, the inverter 9 is controlled based on the smaller torque command value so the motor 4 can be controlled.

Various embodiments of the invention have been described. These and other embodiments are within the scope of the following claims.

The invention claimed is:

1. A vehicle comprising:

a first set of wheels;

a second set of wheels, wherein each of the second set of wheels is different than each of the first set of wheels;

an internal combustion engine that drives the first set of wheels;

a generator, wherein the generator is powered by the internal combustion engine;

an inverter connected to an output of the generator;

an AC motor connected to an output of the inverter, wherein the AC motor drives the second set of wheels;

a required motor power calculator that calculates a motor power required by the AC motor to produce a desired torque at the second set of wheels;

a generator controller that controls the generator based on the required motor power;

a potential power output calculator that calculates a potential power output by the generator based on a current generating status of the generator; and a motor controller that controls the AC motor by controlling the inverter based on the smaller of the required motor power and the potential power output.

2. The vehicle of claim 1, wherein the motor controller calculates a torque command value for the AC motor based on the smaller of the required motor power and the potential power output by comparing the required motor power and the potential power output, and controls the AC motor by controlling the inverter based on the torque command value.

3. The vehicle of claim 2, wherein the motor controller detects a region from at least two regions of generator operation formed by values reflecting a generated voltage of the generator and a generated current of the generator, wherein the at least two regions are separated according to a maximum power output line, and wherein the potential power output calculator calculates the potential power output based on which of the at least two regions encompasses the current generating status of the generator.

4. The vehicle of claim 3, wherein the at least two regions include a first region in which power output of the generator may be increased by reducing the voltage output of the generator and increasing the current output of the generator, and a second region in which power output of the generator may be increased by reducing the current output of the generator and increasing the voltage output of the generator.

5. The vehicle of claim 1, wherein the generator includes a field coil that creates a field, wherein the generator controller includes a field controller that controls the field based on the required motor power.

6. The vehicle of claim 1, wherein the generator is an AC generator.

7. The vehicle of claim 6, further comprising a rectifier, wherein the rectifier converts an alternating current from the AC generator to a direct current.

8. The vehicle of claim 1, further comprising:

a primary torque command calculator that calculates a first torque command value based on the required motor power;

a second torque command calculator that calculates a second torque command value based on the potential power output; and a torque command value determinator that selects the smaller of the first torque command value and the second power command value and supplies it to the motor controller.

9. The vehicle of claim 1, further comprising:

a target power calculator that selects the smaller of the required motor power and the potential power output; and a torque command value calculator that calculates a torque command value for motor control based on an output of the target power calculator and supplies it to the motor controller.

10. The vehicle of claim 1, further comprising:

a target motor torque calculator that calculates the desired torque as a motor torque command value; and wherein the required motor power calculator calculates the required motor power as a product of the motor torque command value and a number of motor revolutions.

11. The vehicle of claim 10 wherein the generator controls the generator based on the required motor power by dividing the required motor power by an efficiency value of the inverter.

12. The vehicle of claim 1 wherein the potential power output calculator calculates the potential power output by the generator by one of comparing a number of generator revolutions to a generator field current estimated based on a voltage generated by the generator and multiplying the voltage generated by the generator by the current generated by the generator.

13. A controller for a vehicle including a first set of wheels, a second set of wheels, an internal combustion engine that drives the first set of wheels, a generator powered by the internal combustion engine, an inverter connected to an output of the generator and an AC motor connected to an output of the inverter to drive the second set of wheels, the controller comprising:

means for calculating a required motor power needed for the AC motor to produce a desired torque at the second set of wheels;

means for controlling the generator based on the required motor power;

means for calculating a potential power output by the generator based on a current generating status of the generator; and means for controlling the AC motor by controlling the inverter based on the smaller of the required motor power and the potential power output.

* * * * *